(12) United States Patent
Colelli et al.

(10) Patent No.: US 10,893,460 B1
(45) Date of Patent: Jan. 12, 2021

(54) METHOD AND APPARATUS TO LIMIT WIRELESS CONNECTIVITY ROAMING OF MULTI-FUNCTION DEVICES

(71) Applicant: Xerox Corporation, Norwalk, CT (US)

(72) Inventors: Dianne S. Colelli, Webster, NY (US); Cheryl A. Nazzaro, Fairport, NY (US); Kok Hwa Ng, Singapore (SG); Owen Yu Chan, Singapore (SG)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/668,522

(22) Filed: Oct. 30, 2019

(51) Int. Cl.
| | |
|---|---|
| G06F 3/12 | (2006.01) |
| H04W 48/04 | (2009.01) |
| H04W 36/00 | (2009.01) |
| H04N 1/44 | (2006.01) |
| H04N 1/00 | (2006.01) |

(52) U.S. Cl.
CPC .......... H04W 48/04 (2013.01); G06F 3/1204 (2013.01); G06F 3/1292 (2013.01); H04N 1/00477 (2013.01); H04N 1/4426 (2013.01); H04W 36/0079 (2018.08); H04W 36/00835 (2018.08)

(58) Field of Classification Search
None
See application file for complete search history.

(56) References Cited

U.S. PATENT DOCUMENTS

| | | | | |
|---|---|---|---|---|
| 8,478,297 B2* | 7/2013 | Morgan | ................ | H04W 64/00 455/456.1 |
| 9,277,469 B2* | 3/2016 | Cucala Garcia | .... | H04W 36/385 |
| 9,414,286 B1* | 8/2016 | Oroskar | ............ | H04W 36/0083 |
| 9,609,576 B1* | 3/2017 | Chindapol | ........ | H04W 72/0453 |
| 2004/0203781 A1* | 10/2004 | Lefkowitz | ......... | H04W 12/0609 455/436 |
| 2007/0082656 A1* | 4/2007 | Stieglitz | ................ | H04L 63/101 455/411 |
| 2008/0031194 A1* | 2/2008 | Yaqub | ................... | H04L 63/107 370/331 |
| 2008/0132239 A1* | 6/2008 | Khetawat | .............. | H04W 36/12 455/438 |
| 2008/0198811 A1* | 8/2008 | Deshpande | ........... | H04W 48/16 370/332 |
| 2009/0094351 A1* | 4/2009 | Gupta | ................... | H04W 12/08 709/220 |
| 2009/0094680 A1* | 4/2009 | Gupta | ............... | H04W 12/0602 726/3 |
| 2010/0124172 A1* | 5/2010 | Tenny | ................... | H04W 24/08 370/242 |
| 2011/0194532 A1* | 8/2011 | Kakkad | ............ | H04W 36/0077 370/331 |
| 2011/0274051 A1* | 11/2011 | Vikberg | .................. | H04W 8/18 370/328 |

(Continued)

FOREIGN PATENT DOCUMENTS

WO  WO-2008103858 A2 *  8/2008  ............ H04W 48/16

*Primary Examiner* — Ted W Barnes (57) ABSTRACT

A method for limiting wireless connectivity roaming of a multi-function device (MFD) is disclosed. For example, the method is executed by a processor and includes failing to re-authenticate on a current access point of a wireless network, accessing a list of access points within a user defined boundary, selecting an access point in the list of access points based on a parameter of the access point, and establishing a wireless communication path with the access point.

16 Claims, 5 Drawing Sheets

(56) References Cited

U.S. PATENT DOCUMENTS

| | | | | |
|---|---|---|---|---|
| 2012/0057474 A1* | 3/2012 | Hirano | ............... | H04W 36/24 |
| | | | | 370/248 |
| 2013/0064226 A1* | 3/2013 | Dinan | ............... | H04W 36/08 |
| | | | | 370/332 |
| 2013/0208644 A1* | 8/2013 | Jung | ............... | H04W 8/186 |
| | | | | 370/312 |
| 2013/0287012 A1* | 10/2013 | Pragada | ............... | H04W 76/22 |
| | | | | 370/338 |
| 2014/0269657 A1* | 9/2014 | Kim | ............... | H04W 4/021 |
| | | | | 370/338 |
| 2014/0301360 A1* | 10/2014 | Bontu | ............... | H04W 36/0061 |
| | | | | 370/331 |
| 2015/0031368 A1* | 1/2015 | Zhong | ............... | H04W 36/0085 |
| | | | | 455/437 |
| 2015/0078244 A1* | 3/2015 | Lee | ............... | H04W 4/06 |
| | | | | 370/312 |
| 2015/0245280 A1* | 8/2015 | Zhou | ............... | H04W 36/32 |
| | | | | 455/434 |
| 2017/0127325 A1* | 5/2017 | Vikberg | ............... | H04W 48/18 |
| 2017/0339698 A1* | 11/2017 | Takarabe | ............... | H04W 72/0453 |
| 2017/0374071 A1* | 12/2017 | Visuri | ............... | H04L 63/101 |
| 2018/0324668 A1* | 11/2018 | Taskin | ............... | H04W 36/0083 |
| 2018/0376523 A1* | 12/2018 | Li | ............... | H04W 12/06 |

* cited by examiner

METHOD AND APPARATUS TO LIMIT WIRELESS CONNECTIVITY ROAMING OF MULTI-FUNCTION DEVICES

The present disclosure relates generally to multi-function devices (MFDs) and relates more particularly to limiting wireless connectivity roaming of MFDs in a wireless network.

BACKGROUND

Multi-function devices (MFDs) can be used to perform a variety of different functions. For example, MFDs can be used to copy documents, print documents, fax documents, and the like. Typically, a user may have a computing device that is communicatively coupled to the MFD. The user may create an image to be printed on the computing device and may send the image data to the MFD to be printed.

MFDs are rarely powered off and on. Rather, the MFDs typically have efficient power saving modes where the MFDs may enter a sleep mode when not in use. However, over time, the wireless connections of the MFDs may gradually roam to different access points. In some instances, the wireless connections of the MFDs may roam to access points that do not provide a very good wireless connection and cause connectivity issues with the MFDs.

SUMMARY

According to aspects illustrated herein, there are provided a method, non-transitory computer readable medium, and an apparatus for limiting wireless connectivity roaming of a multi-function device (MFD). One disclosed feature of the embodiments is a method that fails to re-authenticate on a current access point of a wireless network, accesses a list of access points within a user defined boundary, selects an access point in the list of access points based on a parameter of the access point, and establishes a wireless communication path with the access point.

Another disclosed feature of the embodiments is a non-transitory computer-readable medium having stored thereon a plurality of instructions, the plurality of instructions including instructions which, when executed by a processor, cause the processor to perform an operation that fails to re-authenticate on a current access point of a wireless network, accesses a list of access points within a user defined boundary, selects an access point in the list of access points based on a parameter of the access point, and establishes a wireless communication path with the access point.

Another disclosed feature of the embodiments is an apparatus comprising a processor and a computer readable medium storing a plurality of instructions which, when executed by the processor, cause the processor to perform an operation that fails to re-authenticate on a current access point of a wireless network, accesses a list of access points within a user defined boundary, selects an access point in the list of access points based on a parameter of the access point, and establishes a wireless communication path with the access point.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to limit wireless connectivity roaming of MFDs. As discussed above, MFDs have very good power savings modes when not in use. However, over time the wireless connection of an MFD may roam to different access points for various reasons. For example, some access points may be shut down due to maintenance or failure. As a result, the MFD may attempt to connect to the next access point. When that access point is shut down due to maintenance or failure, the MFD may attempt to connect to another access point.

In some instances, the MFD may be prevented from re-connecting to a previous access point due to blacklisting. For example, when the MFD fails to connect to a previous access point, the MFD may blacklist that access point. Over time, many of the previously connected access points may be blacklisted by the MFD.

As a result, the MFD may eventually be connected to an access point that is located relatively far away from the MFD or that has a poor signal strength to the MFD. In some instances, the access point may be located on a different floor. As a result, the poor signal strength may cause connectivity issues with the MFD and may create a poor user experience.

The present disclosure provides a modification to the MFD to allow the MFD to limit wireless connectivity roaming. For example, the MFD may include a setting to allow a user to define a roaming boundary with a list of user selected access points. When the MFD is disconnected from an access point, the MFD may attempt to connect to another access point within the roaming boundary set by the user. If the MFD has previously connected to all of the MFDs within the roaming boundary, the MFD may then attempt to connect to the first MFD in the list of user selected access points.

In other words, rather than continuing to roam further and further away from the MFD, the user defined boundary may limit how far the MFD may roam for a wireless connection. When the boundary is reached, the list of user selected access points may be refreshed (e.g., the blacklist value for each access point may be reset to zero), and the MFD may then attempt to re-connect to the closest access point on the list.

Figure 1:
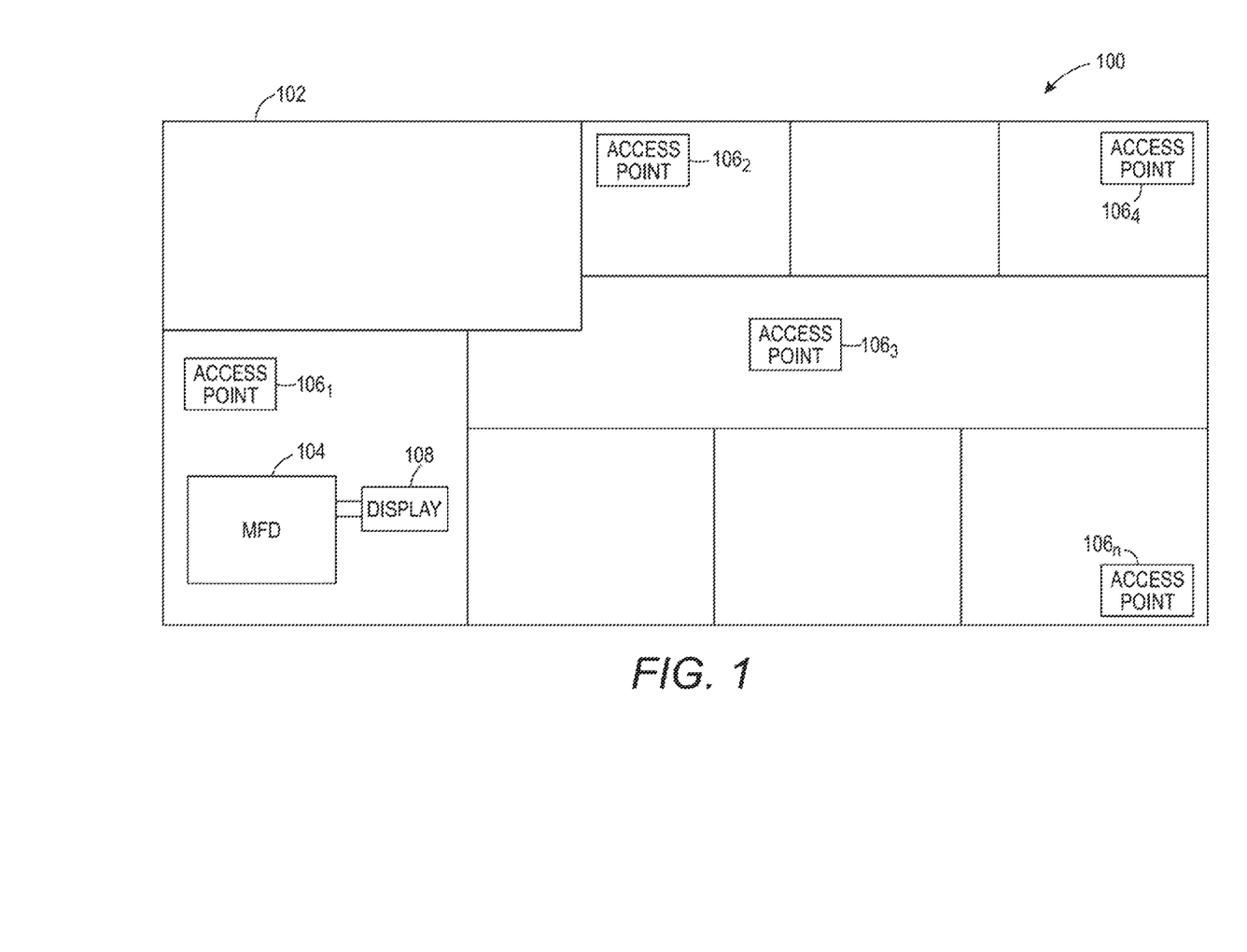
FIG. 1 illustrates a block diagram of a system of the present disclosure.

FIG. 1 illustrates an example network 100 of the present disclosure. In one example, an MFD 104 may be deployed in a location 102. The location 102 may be a building, a floor of an enterprise location, and the like. Although a single MFD 104 is illustrated in the location 102, it should be noted that any number of MFDs 104 may be located in the location 102.

In one embodiment, the MFD 104 may be any type of device that may print, copy, fax, scan, and the like. The MFD 104 may include a display 108 that presents a user interface. The display 108 may be a touch screen display or may include input devices (e.g., a keyboard, a mouse, a touch pad, and the like) to allow the user to interact with the user interface and make selections, provide inputs, and the like.

In one embodiment, the location 102 may include a wireless network that includes a plurality of access points $106_1$ to $106_n$ (hereinafter also referred to individually as an access point 106 or collectively as access points 106). The access points 106 may be wireless access points that provide wireless connectivity to the overall wireless network. The access points 106 may provide a local area network (LAN) within the location 102. The access points 106 may be in communication with each other and with a gateway router that provides access to a wide area network (WAN).

The access points 106 may be part of the same wireless network (e.g., an SSID), but be configured with different identification numbers (e.g., also referred to as the BSSID). For example, as a mobile device moves throughout the location 102, the mobile device may be connected to the overall wireless network. However, access to the overall wireless network may be provided by each access point 106 depending on the location of the mobile device. As the mobile device moves from a location near the access point $106_1$ to the access point $106_2$, connection to the wireless network for the mobile device may be passed on from access point $106_1$ to access point $106_2$.

However, the MFD 104 may be a stationary device. In other words, the MFD 104 generally does not move throughout the location 102. Initially, the MFD 104 may be connected to the access point $106_1$. However, over time the MFD 104 may begin to roam to other access points $106_2$ to $106_n$. As noted above, the access points 106 may be shut down due to maintenance, failure, or any other reason and may cause the MFD 104 to attempt to connect to a different access point.

When the MFD 104 attempts to connect to the access point that is shut down and the attempt fails, the MFD 104 may blacklist that access point. Over time, the MFD 104 may be connected to an access point that provides very poor signal strength and may create connectivity issues. In some instances the MFD 104 may connect to access points on a different floor or a different building.

Figure 2:
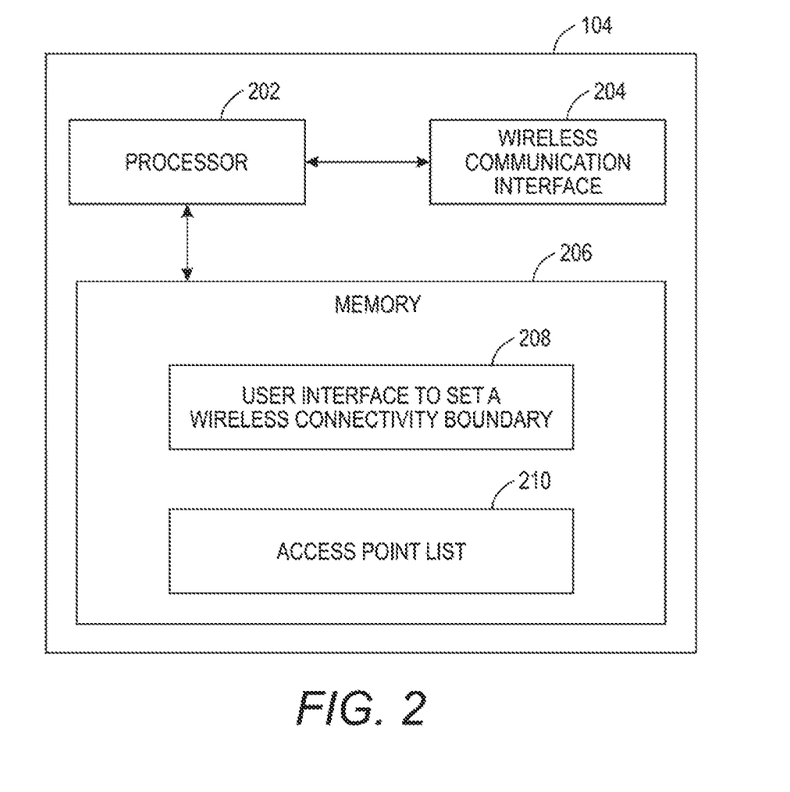
FIG. 2 illustrates a block diagram of an example MFD that limits wireless connectivity roaming of MFDs of the present disclosure.

FIG. 2 illustrates a block diagram of the MFD 104 that limits wireless connectivity roaming. In one embodiment, the MFD 104 may include a processor 202, a wireless communication interface 204, and a memory 206. It should be noted that the MFD 104 has been simplified for ease of explanation and may include additional components that are not shown. For example, the MFD 104 may include other components such as a digital front end, various paper paths, a paper feeder, a print engine, printheads, a scanner, a finishing module, and the like.

In one embodiment, the processor 202 may be communicatively coupled to the wireless communication interface 204 and the memory 206. The processor 202 may control operation of the wireless communication interface 204 and may execute instructions stored in the memory 206 to perform the functions described herein.

In one embodiment, the wireless communication interface 204 may be a Wi-Fi radio or any other type of wireless device that can establish a wireless communication path to the access points 106. In one embodiment, the wireless communication interface 204 may communicate with all of the access points 106 to obtain information that may be presented to the user to limit the wireless connectivity roaming, as discussed in further details below.

In one embodiment, the memory 206 may be a non-transitory computer readable medium. The memory 206 may be a hard disk drive, a solid state drive, random access memory (RAM), read only memory (ROM), and the like.

In one embodiment, the memory 206 may include a user interface to set a wireless connectivity boundary 208 (also referred to herein as a user interface 208) and an access point list 210. In one embodiment, the user interface 208 may be presented to the user in the display 108 of the MFD 104. The user interface 208 may allow the user create a user defined boundary. The user defined boundary may defined by the user selected access points 106 to limit how far the MFD 104 may roam for a wireless connection.

For example, the user may want to create a boundary that is no further than the access point $106_3$ illustrated in FIG. 1. As a result, the user defined boundary may include the access points $106_1$, $106_2$, and $106_3$. The user selected access points $106_1$, $106_2$, and $106_3$ may be stored as the access point list 210.

In one embodiment, the access point list 210 may control how far the MFD is allowed to roam in the location 102 for an access point 106. For example, the MFD 104 may be initially authenticated to the access point $106_1$. For example, the MFD 104 may establish a wireless connection to the access point $106_1$ with the proper security credentials (e.g., a password associated with the access point $106_1$). At a later time, the MFD 104 may be disconnected from the access point $106_1$ and may attempt to re-authenticate with the access point $106_1$. However, the re-authentication may fail (e.g., the access point $106_1$ may still be offline for maintenance), and the access point $106_1$ may be blacklisted.

As a result, the MFD 104 may authenticate to the next access point on the access point list 210 (e.g., the access point $106_2$). At a later time, the MFD 104 may be disconnected from the access point $106_2$ and re-authentication may fail again to the access point $106_2$. As a result, the MFD 104 may attempt to authenticate to the next access point available on the access point list 210 (e.g., the access point $106_3$). However, at a later time, the MFD 104 may be disconnected from the access point $106_3$ and re-authentication may fail.

Previously, the MFD 104 may have attempted to authenticate to an access point $106_4$ that may be far away from the MFD 104 and provide a weak signal strength. However, in the present disclosure, when all of the access points in the access point list 210 have been previously used, the access point list 210 may be reset to allow attempts to re-authenticate to the access points in the access point list 210 again.

For example, resetting the access point list 210 may include decrementing the blacklist counter for each access point in the access point list 210 back to 0. As a result, when all of the access points in the access point list 210 have been used, the blacklist counter for each access point may be reset to a value of 0. The MFD 104 may then attempt to re-authenticate with the first access point or the access point with the strongest wireless signal in the access point list 210 (e.g., the access point $106_1$). In other words, the MFD 104 may continuously cycle through the access points in access point list 210 as the MFD 104 loses connections to access points 106 for various reasons and attempts to authenticate to other access points 106 in the location 102. Said another way, the access point list 210 may control which access points 106 the MFD 104 may authenticate with and may limit the wireless connectivity roaming of the MFD 104.

Figure 3:
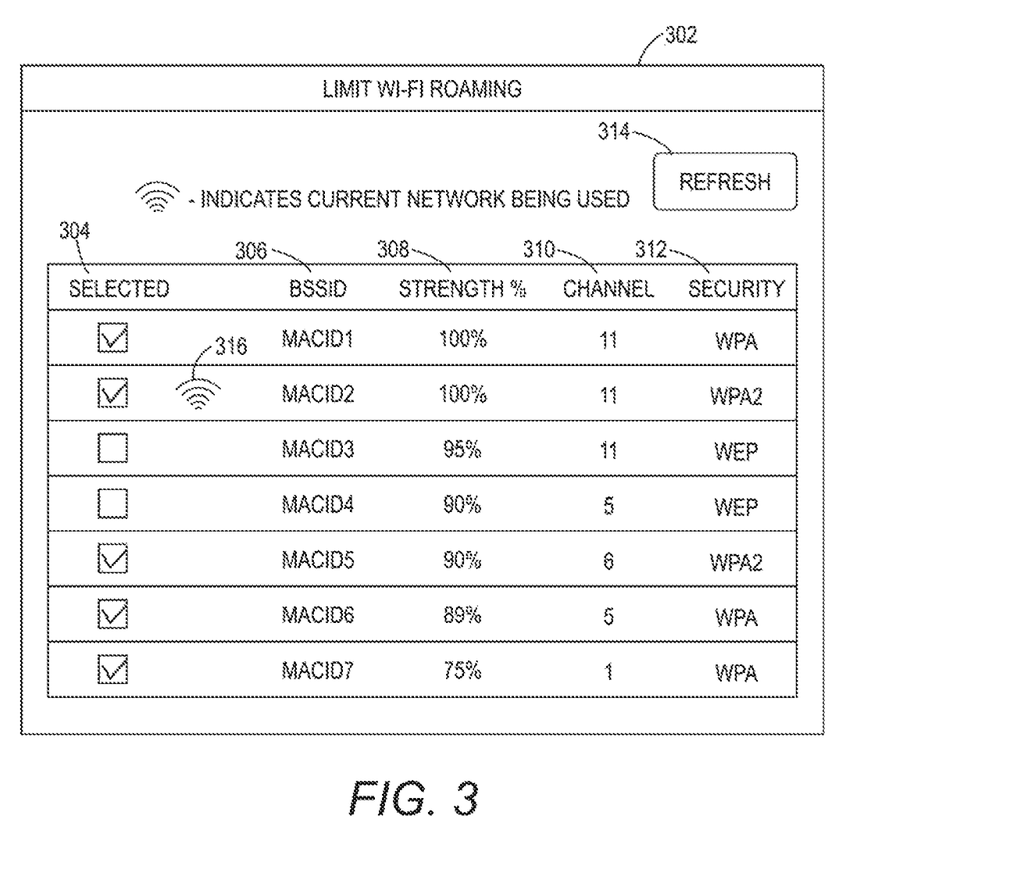
FIG. 3 illustrates an example screenshot to set access points for a user defined boundary to limit wireless connectivity roaming of the MFD of the present disclosure.

FIG. 3 illustrates a screenshot 302 of an example of the user interface 208 that may be presented to the user on the display 108. In one embodiment, the screenshot 302 may present a table that lists all available access points. The table may include columns 304, 306, 308, 310, and 312. A glyph 316 may indicate which access point the MFD 104 is currently authenticated with or connected to.

In one embodiment, the column 304 may provide boxes to allow a user to select the access points to include in the access point list 210 and set the user defined boundary. The column 306 may provide identification information or BSSID for the access points. In one embodiment, the identification information may be the media access control (MAC) identification (ID) number of the access points. In one embodiment, the identification information may also include a label (e.g., access point in conference room, access point in hallway, $2^{nd}$ floor access point, and the like).

In one embodiment, the column 308 may provide a signal strength percentage associated with each access point. The signal strength percentage may also provide a location. For example, the access point with the highest signal strength percentage may also be the access point that is located closest to the MFD 104. Conversely, the access point with the lowest signal strength percentage may also be the access point that is located the furthest away from the MFD 104.

In one embodiment, the column 310 may provide a channel number being used by the access point. In one embodiment, the column 312 may provide the security protocol used by the access point (e.g., wired equivalent privacy (WEP), Wi-Fi protected access (WPA), WPA-2, and the like).

In one embodiment, the user may interact with the user interface shown in the screenshot 302 to select the access points by checking the boxes associated with each access point in the column 304. In one embodiment, the user may select the access points based on signal strength or location (e.g., the closer the access point, the stronger the wireless signal strength), the channel used by the access point, or the security protocol used by the access point. For example, some access points may be closer or have a stronger signal strength percentage, but may use a channel that is not available on the MFD 104. In another example, some access points may have a stronger signal strength percentage, but the access points may use a weaker security protocol.

In one embodiment, the user interface 208 shown in the screenshot 302 may also include a refresh button 314. The refresh button 314 may cause the MFD 104 to re-broadcast a signal to all nearby access points. The broadcast signal may request identification information, measure signal strength, channel information, security protocols used by the access points, and the like from the access points to update the information provided in the table. The refresh button 314 may also allow new access points to be identified or access points that were shut down, but reactivated to reappear in the table. Thus, a user may periodically use the refresh button 314 to update information related to which access points are available and the information associated with the access points. The updated information may then be used to change the access points that are selected for the access point list 210 based on the updated information.

Figure 4:
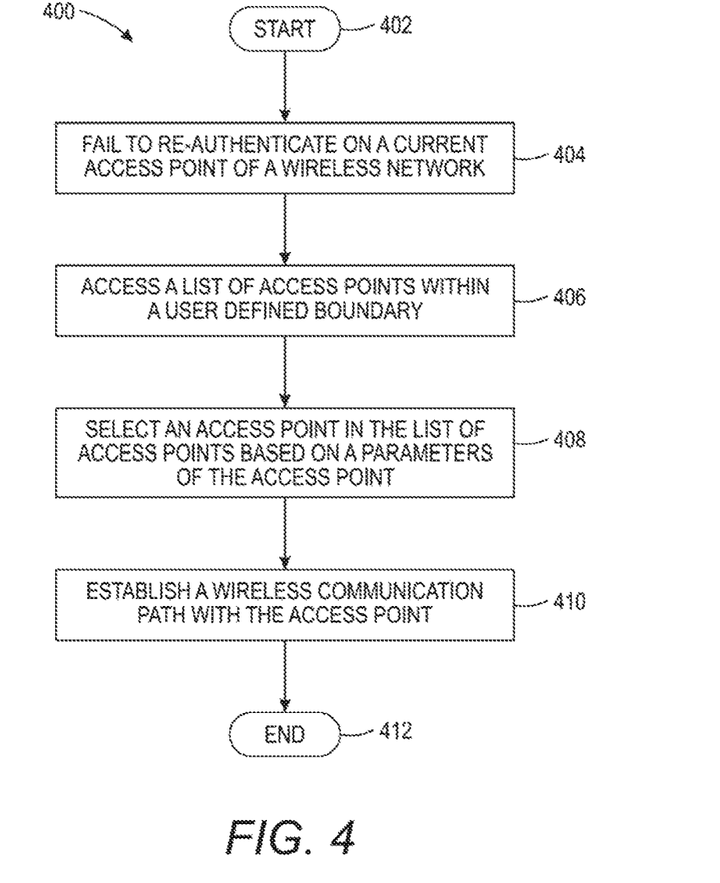
FIG. 4 illustrates a flowchart of an example method for limiting wireless connectivity roaming of an MFD of the present disclosure.
Figure 5:
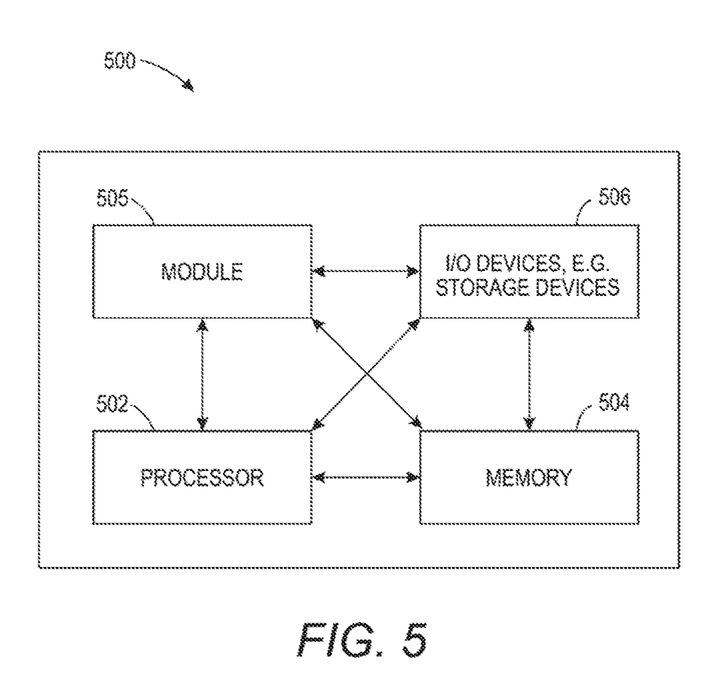
FIG. 5 illustrates a high-level block diagram of an example computer suitable for use in performing the functions described herein.

FIG. 4 illustrates a flowchart of an example method 400 for limiting wireless connectivity roaming of an MFD of the present disclosure. In one embodiment, one or more blocks of the method 400 may be performed by the MFD 104 or a computer/processor that controls operation of an MFD as illustrated in FIG. 5 and discussed below.

At block 402, the method 400 begins. At block 404, the method 400 fails to re-authenticate on a current access point of a wireless network. For example, the MFD may be connected to the current access point. However, at some point the current access point may be taken off-line or powered down for maintenance, failure, or any other reason. The MFD may attempt to re-authenticate with the access point, but fail. As a result, the blacklist value may be incremented until it exceeds a threshold (e.g., 1, 2 or any other value). When the blacklist value exceeds threshold, the MFD may no longer attempt to re-authenticate with the current access point.

At block 406, the method 400 accesses a list of access points within a user defined boundary. When the current access point is blacklisted, the MFD may attempt to authenticate to another access point that is in the list of access points. In one embodiment, the list of access points may be those access points selected by the user to define the boundary for wireless connectivity roaming.

In one embodiment, the list of access points and the user defined boundary may be selected via a user interface of the MFD. For example, the user may select the desired access points from a list of all available access points. The list of access points may be stored in local memory of the MFD. Thus, the boundary may be predefined by the user before the method 400 begins.

At block 408, the method 400 selects an access point in the list of access points based on a parameter of the access point. In one embodiment, the parameter may include a signal strength percentage, a channel that is used by the access point, a security protocol used by the access point, and the like, from the access points available in the list. In one embodiment, the access point with the next highest signal strength percentage within the list of access points may be selected by the MFD for authentication.

In one embodiment, the MFD may select the access point based on a parameter that was not previously selected. In other words, if the MFD blacklisted a previously used access point, the previously used access point may not be selected.

At block 410, the method 400 establishes a wireless communication path with the access point. For example, the MFD may attempt to authenticate with the access point that is selected from the list of access points. After the MFD authenticates to the access point, the MFD may access the wireless network via the selected access point.

In one embodiment, the MFD may fail to re-authenticate to the selected access point (e.g., similar to the failure to authenticate to the current access point in block 404). The MFD may access the list of access points again. If there are additional access points in the list of access points available for authentication that were not previously used, the MFD may select another access point and attempt to authenticate to that access point.

However, if the access point is the last access point in the list of access points, the MFD may then re-attempt to connect with the first access point in the list of access points. The "first" access point may be the access point with the highest signal strength percentage in the list of access points or the access point that the MFD is initially authenticated to after the list of access points is created. For example, the list of access points may be ordered based on the signal strength percentage, and the "first" access point may be the first access point in the ordered list. In another example, the list of access points may be ordered based on when the MFD was connected to the access point. For example, the list of access points may be ordered based on a sequence of when the MFD authenticated to each access point. Thus, the "first" access point may be the access point that the MFD was initially authenticated to after the list of access points was created.

In one embodiment, if the access point in block 410 is the last access point in the list of access points, the list of access points may be reset. In other words, the blacklist value associated with each access point in the list of access point may be decremented to a value of 0. As a result, the MFD may select any access point in the list of access points (e.g., the "first" access point) and authenticate to that access point. At block 412, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for limiting wireless connectivity roaming of an MFD, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for limiting wireless connectivity roaming of an MFD (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for limiting wireless connectivity roaming of an MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for limiting wireless connectivity roaming of a multi-function device (MFD), comprising:
   detecting, by a processor of the MFD, that a connection to a current access point of a wireless network is disconnected;
   attempting, by the processor, to re-authenticate on the current access point;
   receiving, by the processor, a notification that a blacklist value of the MFD for the current access point exceeds a predefined threshold to prevent re-authentication to the current access point;
   accessing, by the processor, a list of access points within a user defined boundary;
   selecting, by the processor, an access point in the list of access points based on a parameter of the access points that was not previously selected; and
   establishing, by the processor, a wireless communication path with the access point.

2. The method of claim 1, further comprising:
   failing, by the processor, to re-authenticate on the access point in the list of access points;
   accessing, by the processor, the list of access points within the user defined boundary;
   determining, by the processor, that the access point is a last access point in the list of access points;
   selecting, by the processor, a first access point in the list of access points; and
   establishing, by the processor, a wireless communication path with the access point.

3. The method of claim 1, wherein the list of access points within the user defined boundary is defined by a user via a user interface of the MFD.

4. The method of claim 3, wherein the user interface is to display all available access points and is to provide an option to the user to select one or more of the all available access points to create the user defined boundary.

5. The method of claim 4, wherein the user interface provides at least one of: a media access control (MAC) identification number of each one of the available access points, a signal strength percentage of each one of the available access points, a channel number of each one of the available access points, or a security type of each one of the available access points.

6. The method of claim 1, wherein the parameter comprises a signal strength of the access point and a security protocol of the access point.

7. The method of claim 1, wherein the parameter of the access point comprises a signal strength of the access point.

8. The method of claim 1, wherein the parameter comprises a security protocol of the access point.

9. A non-transitory computer-readable medium storing a plurality of instructions, which when executed by a processor, cause the processor to perform operations for limiting wireless connectivity roaming of a multi-function device (MFD), the operations comprising:

detecting that a connection to a current access point of a wireless network is disconnected;

attempting to re-authenticate on the current access point;

receiving a notification that a blacklist value of the MFD for the current access point exceeds a predefined threshold to prevent re-authentication to the current access point;

accessing a list of access points within a user defined boundary;

selecting an access point in the list of access points based on a parameter of the access points that was not previously selected; and establishing a wireless communication path with the access point.

10. The non-transitory computer-readable medium of claim 9, further comprising:

failing to re-authenticate on the access point in the list of access points;

accessing the list of access points within the user defined boundary;

determining that the access point is a last access point in the list of access points;

selecting a first access point in the list of access points; and establishing a wireless communication path with the access point.

11. The non-transitory computer-readable medium of claim 9, wherein the list of access points within the user defined boundary is defined by a user via a user interface of the MFD.

12. The non-transitory computer-readable medium of claim 11, wherein the user interface is to display all available access points and is to provide an option to the user to select one or more of the all available access points to create the user defined boundary.

13. The non-transitory computer-readable medium of claim 12, wherein the user interface provides at least one of: a media access control (MAC) identification number of each one of the available access points, a signal strength percentage of each one of the available access points, a channel number of each one of the available access points, or a security type of each one of the available access points.

14. The non-transitory computer-readable medium of claim 9, wherein the parameter comprises a signal strength of the access point and a security protocol of the access point.

15. The non-transitory computer-readable medium of claim 9, wherein the parameter of the access point comprises a signal strength of the access point.

16. The non-transitory computer-readable medium of claim 9, wherein the parameter comprises a security protocol of the access point.

\* \* \* \* \*